US012668454B2

(12) United States Patent (10) Patent No.: US 12,668,454 B2
Kugiya et al. (45) Date of Patent: Jun. 30, 2026

(54) ELEVATOR DEVICE

(71) Applicant: Mitsubishi Electric Corporation, Tokyo (JP)

(72) Inventors: Takuo Kugiya, Tokyo (JP); Masayuki Kakio, Tokyo (JP); Eiji Yokoyama, Tokyo (JP); Hidetaka Ishiguro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 807 days.

(21) Appl. No.: 18/021,395

(22) PCT Filed: Oct. 21, 2020

(86) PCT No.: PCT/JP2020/039591
§ 371 (c)(1),
(2) Date: Feb. 15, 2023

(87) PCT Pub. No.: WO2022/085124
PCT Pub. Date: Apr. 28, 2022

(65) Prior Publication Data
US 2024/0034594 A1 Feb. 1, 2024

(51) Int. Cl.
*B66B 1/34* (2006.01)
*G01B 7/16* (2006.01)

(52) U.S. Cl.
CPC .............. *B66B 1/3492* (2013.01); *G01B 7/16* (2013.01)

(58) Field of Classification Search
CPC ................................. B66B 1/3492; G01B 7/16
(Continued)

(56) References Cited

U.S. PATENT DOCUMENTS

2002/0104716 A1* 8/2002 Zaharia ................. B66B 1/3492
187/394
2013/0284544 A1 10/2013 De Coi et al.
(Continued)

FOREIGN PATENT DOCUMENTS

CN 104936879 A 9/2015
JP 2007-168950 A 7/2007
(Continued)

OTHER PUBLICATIONS

International Search Report mailed on Dec. 22, 2020, received for PCT Application PCT/JP2020/039591, filed on Oct. 21, 2020, 6 pages including English Translation.
(Continued)

*Primary Examiner* — Erick D Glass
(74) *Attorney, Agent, or Firm* — XSENSUS LLP

(57) ABSTRACT

An elevator device includes: a car which travels through a hoistway; a code tape suspended in the hoistway; a code read sensor which reads a code described in the code tape; a code tape elongation/contraction detection unit which detects an amount of elongation or contraction of the code tape; a reference marker which is installed in the hoistway and which indicates a reference position of the car; a reference sensor which is installed in the car and which detects the reference marker; and a control unit which, when a condition based on the amount of elongation or contraction is satisfied, moves the car to the reference position in accordance with a detection result of the reference sensor, causes position information of the car to be read as reference position information, calculates compensatory position information based on the reference position information, and controls the car using the compensatory position information.

12 Claims, 12 Drawing Sheets

(58) Field of Classification Search
USPC ......................................................... 187/247
See application file for complete search history.

(56)                     References Cited

U.S. PATENT DOCUMENTS

| | | | |
|---|---|---|---|
| 2015/0059195 A1* | 3/2015 | De Coi | B66B 13/22 |
| | | | 33/760 |
| 2015/0336768 A1 | 11/2015 | Otsuka et al. | |
| 2016/0311649 A1* | 10/2016 | Puranen | B66B 5/0018 |
| 2019/0389694 A1* | 12/2019 | Herkel | B66B 5/005 |

FOREIGN PATENT DOCUMENTS

| | | | |
|---|---|---|---|
| JP | 2013-230936 A | 11/2013 | |
| JP | 2015-51876 A | 3/2015 | |

OTHER PUBLICATIONS

Action dated Mar. 27, 2025 in the corresponding Chinese patent application No. 202080106061.X, 14pp.
Korean Office Action issued Dec. 30, 2024, in the corresponding Korean patent application No. 10-2023-7011930, 9pp.

* cited by examiner

*Fig. 1*

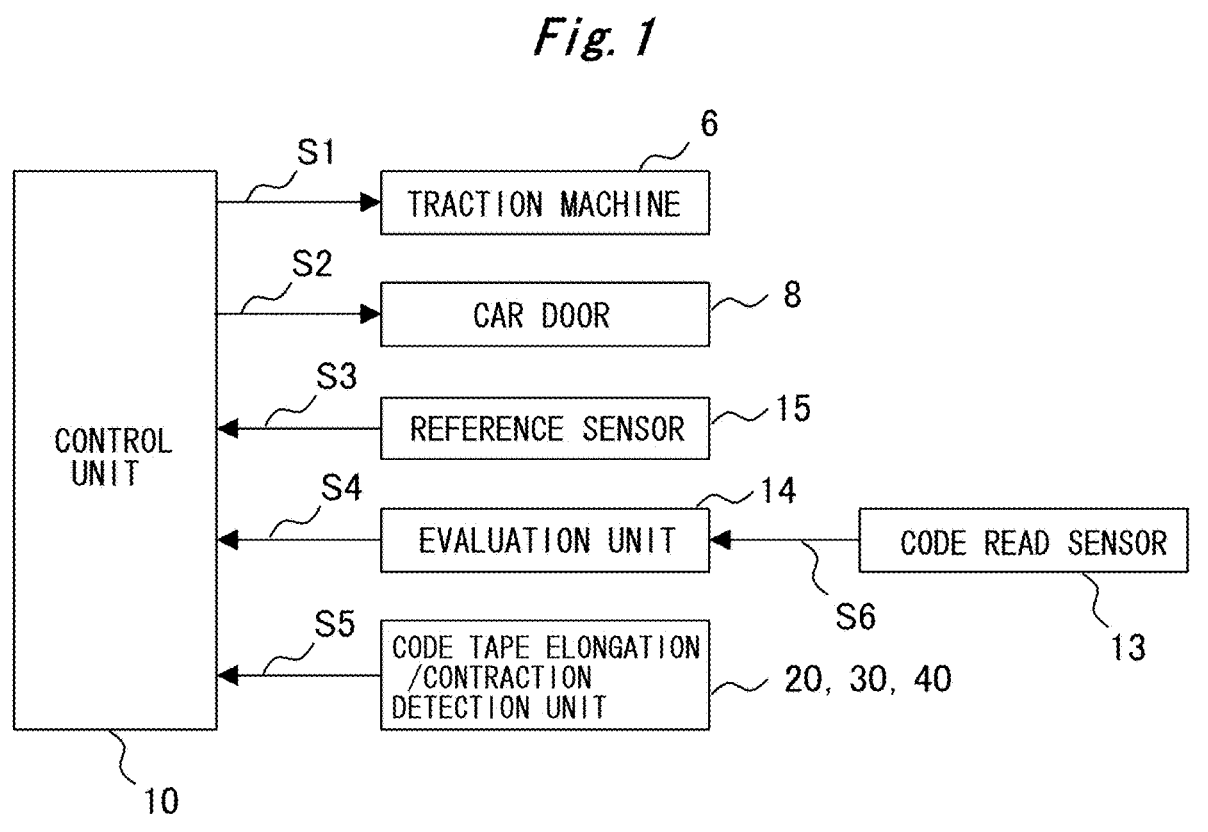

```
            S1
CONTROL ────────────→  TRACTION MACHINE        6
 UNIT
            S2
        ────────────→  CAR DOOR                 8

S3
        ←────────────  REFERENCE SENSOR         15

S4
        ←────────────  EVALUATION UNIT   ←──── CODE READ SENSOR
                                          S6
                                                       13
            S5
        ←────────────  CODE TAPE ELONGATION
                        /CONTRACTION
                        DETECTION UNIT    20, 30, 40

```
        ┌──────────────┐
        │    START     │
        └──────┬───────┘
               ▼
     ┌────────────────────┐
     │ INITIAL ADJUSTMENT │ ─── ST1
     └────────┬───────────┘
              ▼
     ┌────────────────────┐
     │ CONTINUE CAR TRAVEL│ ─── ST2
     └────────┬───────────┘
              ▼
         ╱────────────╲                              ╱────────────╲
        ╱ ELONGATION/  ╲         ST3                ╱ CHANGE FROM  ╲      ST6
       ╱ CONTRACTION    ╲                          ╱ CONDITION AT   ╲
       ╲ DETECTION SWITCH╱  No          ╲─────────▶╲  PREVIOUS      ╱  No
        ╲ 242a OR 242d  ╱                           ╲ CALCULATION? ╱
         ╲  PRESSED?   ╱                             ╲────────────╱
          ╲──────────╱                                    │ Yes
              │ Yes                              ┌──────────────────┐
     ┌────────────────────┐                      │   MOVE CAR TO    │
     │  PAUSE CAR TRAVEL  │                      │ REFERENCE POSITION│ ─── ST7
     └────────┬───────────┘  ST4                 └────────┬─────────┘
              ▼                                  ┌──────────────────┐
         ╱────────────╲                          │ ACQUIRE POSITION │
        ╱ ELONGATION/  ╲                         │ INFORMAITION OF CAR│ ─── ST8
       ╱ CONTRACTION    ╲                        └────────┬─────────┘
       ╲ DETECTION SWITCH╱  No                   ┌──────────────────┐
        ╲ 242a AND 242d ╱                        │ CALCULATE COMPENSATORY│
         ╲  SEPARATED? ╱                         │  POSITION INFORMATION │ ─── ST9
          ╲──────────╱     ST5                   └────────┬─────────┘
              │ Yes
              ▼
         ╱────────────╲
        ╱  CONTINUE    ╲
       ╱   CAR TRAVEL?  ╲  Yes
       ╲               ╱────────────────────────────▶
        ╲─────────────╱
          │ No     ST10
          ▼
     ┌──────────┐
     │   END    │
     └──────────┘
```

```
          ┌─────────────┐
          │    START    │
          └─────────────┘
                 │
                 ▼
   ┌──────────────────────────┐
   │   INITIAL ADJUSTMENT     │ ～ ST11
   └──────────────────────────┘
                 │
                 ▼ ◄─────────────────────┐
   ┌──────────────────────────┐          │
   │   CONTINUE CAR TRAVEL    │ ～ ST2    │
   └──────────────────────────┘          │
                 │                        │
                 ▼            ST14        │
         ◇───────────────────◇           │
        ╱  ABSOLUTE VALUE OF   ╲          │
       ◇ DIFFERENCE FROM ANGLE  ◇         │
       ◇  AT PREVIOUS           ◇  No     │
        ╲ CALCULATION ≧ A2?    ╱──────┐   │
         ◇───────────────────◇        │   │
                 │ Yes                 │   │
                 ▼                     │   │
   ┌──────────────────────────┐       │   │
   │ CALCULATE COMPENSATORY   │       │   │
   │ POSITION INFORMATION     │       │   │
   └──────────────────────────┘ ST15  │   │
                 │ ◄───────────────────┘   │
                 ▼                         │
         ◇───────────────────◇            │
        ╱   CONTINUE CAR       ╲           │
       ◇     TRAVEL?            ◇ Yes ─────┘
        ╲                      ╱
         ◇───────────────────◇  ST10
                 │ No
                 ▼
          ┌─────────────┐
          │     END     │
          └─────────────┘
```

*Fig. 12*

ELEVATOR DEVICE

CROSS-REFERENCE TO RELATED APPLICATION

The present application is based on PCT filing PCT/JP2020/039591, filed Oct. 21, 2020, the entire contents of which are incorporated herein by reference.

FIELD

The present disclosure relates to an elevator device which detects a position of a car that travels through a hoistway.

BACKGROUND

Background

Conventionally, in order to detect a position of a car relative to a hall position and a hoistway terminal floor, systems have been adopted involving installing a plate at a position at a predetermined distance from each hall position or the terminal floor and detecting the plate with a sensor installed in the car. However, in recent years, many techniques have been proposed which enable a position of a car over an entire range of a hoistway to be continuously detected by providing an elongated detected body over the entire range of the hoistway and detecting the non-detected body with a sensor installed in the car. Accordingly, work requiring skill such as installation work of a plate or adjustment of an installation position of the plate need no longer be performed and work can be carried out by non-skilled workers.

PTL 1 discloses an elevator facility equipped with a code tape as a detected body suspended in a hoistway, a reference marker provided in the hoistway, and a sensor which detects a code described in the code tape and the reference marker. The elevator facility matches code read information to a reference position when the reference marker is detected by the sensor.

CITATION LIST

Patent Literature

[PTL 1] JP 2013-230936 A

SUMMARY

Technical Problem

A code tape elongates or contracts due to a change in temperature. When the code tape elongates or contracts, an error corresponding to an amount of the elongation and the contraction is created in information on a detected position of a car relative to a true car position. The error causes trouble such as a step difference between the car and a hall upon landing. While the elevator facility described above enables an error to be compensated for when detecting a reference mark, accommodating error due to changes in temperature which can always occur requires reference markers to be provided at positions passed by a car in one run or, in other words, as many reference markers as the number of floors and more effort must be spent on installation and adjustment.

The present disclosure has been made in order to solve the problem described above and an object thereof is to provide an elevator device which enables accurate position control of a car to be performed without increasing the number of installed reference markers even when a code tape elongates or contracts due to changes in temperature.

Solution to Problem

An elevator device according to the present disclosure includes: a car which travels through a hoistway; a code tape suspended in the hoistway; a code read sensor which reads a code described in the code tape; a code tape elongation/contraction detection unit which detects an amount of elongation or contraction of the code tape; a reference marker which is installed in the hoistway and which indicates a reference position of the car; a reference sensor which is installed in the car and which detects the reference marker; and a control unit which, when a condition based on the amount of elongation or contraction is satisfied, moves the car to the reference position in accordance with a detection result of the reference sensor, causes position information of the car determined based on the code to be read as reference position information, calculates compensatory position information based on the reference position information, and controls the car using the compensatory position information, wherein the condition is that the amount of elongation or contraction from the time of a previous calculation of the compensatory position information is equal to or larger than a predetermined amount.

Advantageous Effects of Invention

According to the present disclosure, since the elevator device calculates compensatory position information of a car based on reference position information, even when a code tape elongates or contracts due to changes in temperature, accurate position control of the car can be performed without increasing the number of installed reference markers.

BRIEF DESCRIPTION OF DRAWINGS

FIG. 1 is a block diagram showing an example of an elevator device according to first to third embodiments.

FIG. 4B is a graph showing a relationship between an actual position of a car when a reference position is set as an origin and a position calculated from a code read sensor according to the first to third embodiments.

FIG. 5 is a flow chart showing an example of a procedure of control of a car according to the first embodiment.

FIG. 7 is a diagram showing an example of a configuration of a code tape elongation/contraction detection unit according to the second embodiment.

FIG. 9 is a flow chart showing another example of the procedure of control of a car according to the second embodiment.

FIG. 12 is a flow chart showing another example of the procedure of control of a car according to the third embodiment.

DESCRIPTION OF EMBODIMENTS

Hereinafter, an elevator device 1 according to embodiments of the present disclosure will be described with reference to the drawings. Note that, for the sake of brevity, coordinate axes of an XYZ orthogonal coordinate system are shown in each drawing. A same direction as a direction in which a user of the elevator device 1 boards and alights from a car 3 is defined as an X-axis direction. A direction in which the user boards the car 3 is a +X direction and a direction in which the user alights from the car 3 is a –X direction. A left-right direction as viewed from a hall of the elevator device 1 is defined as a Y-axis direction. A left side is a +Y direction and a right side is a –Y direction. An up-down direction in which the car 3 travels is defined as a Z-axis direction. An upper side is a +Z direction and a lower side is a –Z direction.

First Embodiment

Figure 2:
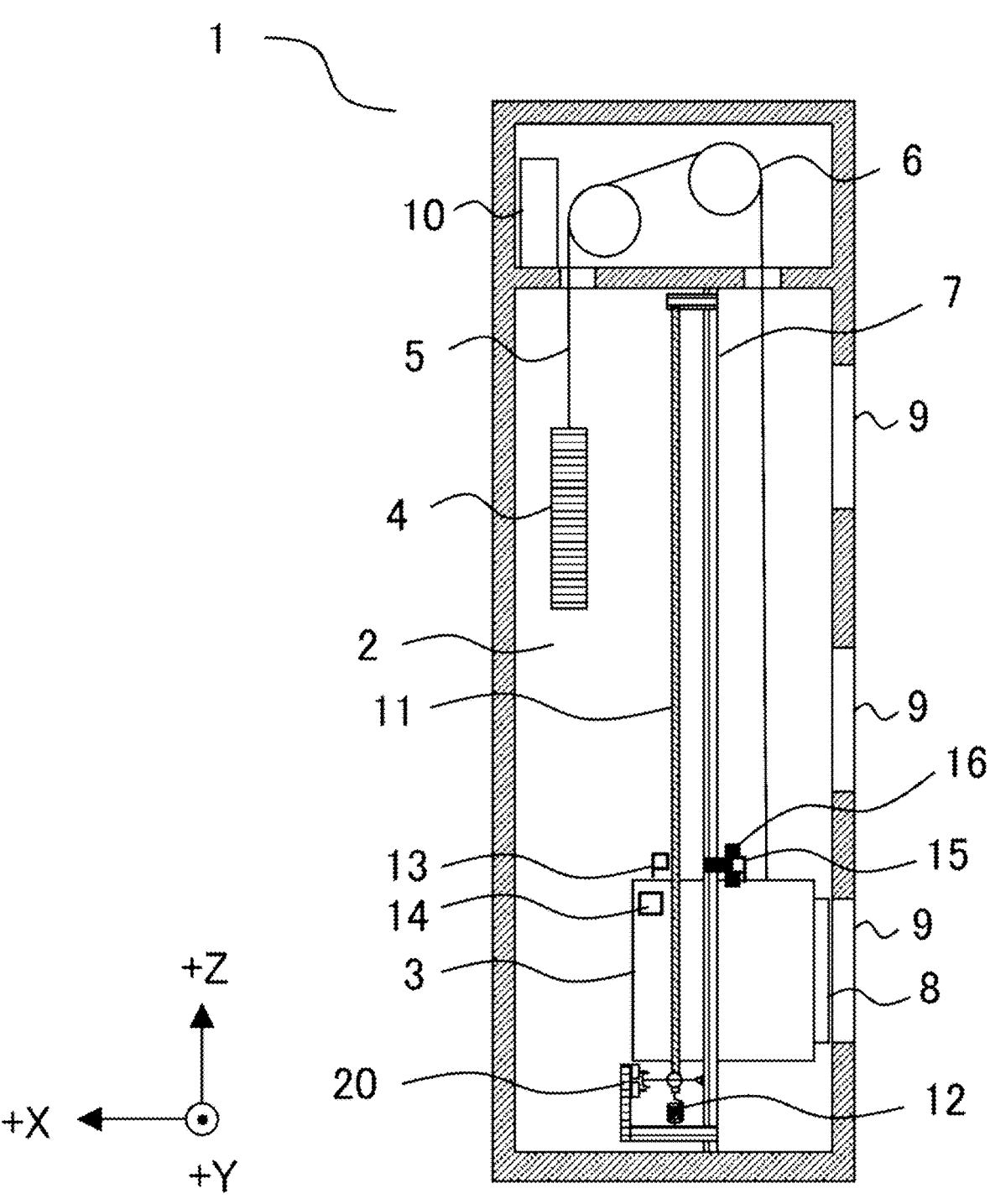
FIG. 2 is a diagram showing an example of a configuration of the elevator device according to the first embodiment.

A configuration of the elevator device 1 according to a first embodiment will be described with reference to FIGS. 1 and 2. FIG. 1 is a block diagram showing an example of the elevator device 1 according to the first embodiment. FIG. 2 is a diagram showing an example of a configuration of the elevator device 1 according to the first embodiment.

The car 3 is connected to a traction machine 6. Specifically, the car 3 is coupled to a counter weight 4 via a main rope 5 hung on a pulley in the traction machine 6. The car 3 travels through a hoistway 2 as a torque signal S1 from a control unit 10 is input to the traction machine 6. The torque signal S1 represents a drive torque and a braking torque.

A rail 7 is firmly fixed to the hoistway 2 and guides the car 3.

A car door 8 is opened and closed by inputting an open/close control signal S2 from the control unit 10. A hatch door 9 operates so as to open and close in conjunction with the car door 8.

The control unit 10 controls rising and falling of the car 3 by outputting the torque signal S1 to the traction machine 6. The control unit 10 performs open/close control of the car door 8 by outputting the open/close control signal S2 to the car door 8. The control unit 10 moves the car 3 to a reference position in accordance with a detection result from a reference sensor 15 (to be described later) or, in other words, a reference marker detection signal S3. In this case, the reference position refers to a position where a compensation amount with respect to position information S4 of the car 3 is calculated and is, for example, near a bottom floor separated from a suspension position of a code tape 11. The position information S4 is determined by a code read signal S6 from a code read sensor 13 (to be described later). The control unit 10 inputs the position information S4 from an evaluation unit 14. The evaluation unit 14 may be included in the control unit 10. In this case, the control unit 10 inputs the code read signal S6 and generates the position information S4 of the car 3 which is determined based on a code.

When a condition based on an amount of elongation or contraction S5 from a code tape elongation/contraction detection unit 20 (to be described later) is satisfied, the control unit 10 moves the car 3 to the reference position and causes the position information S4 of the car 3 to be read. Hereinafter, the position information S4 at the reference position will be referred to as "reference position information". The control unit 10 calculates a compensation amount with respect to the position information S4 based on the reference position information. In other words, the control unit 10 calculates compensatory position information and controls the car 3 using the compensatory position information. A method of calculating the compensatory position information will be described in detail later with reference to FIGS. 4A and 4B. The control unit 10 includes electric circuitry and electronic circuitry for controlling various devices, and the control unit 10 calculates various sensor signals, a signal of a hall call button, a signal of a car call button, and a signal of a maintenance controller, controls operations of the traction machine 6, the car door 8, and the hatch door 9, and operates and controls the elevator device 1.

The code tape 11 has a code for specifying a position of the car 3 and is suspended in the hoistway 2 while being imparted tension by a code tape tension spring 12. While the code tape 11 can be suspended at any position in the hoistway 2, in order to accurately comprehend a positional relationship with the car 3, the code tape 11 is desirably suspended by the rail 7 which guides the car 3. In this case, the code tape 11 is suspended from a support part (not illustrated) at an upper end part of the rail 7, and the code tape 11 is kept parallel with the Z-axis by being fixed by the support part and the code tape tension spring 12.

The code read sensor 13 is installed in the car 3, and reads a code described in the code tape 11 and generates the code read signal S6.

The reference sensor 15 is installed in the car 3. The reference sensor 15 detects a reference marker 16 which indicates a reference position of the car 3. The reference marker 16 is installed in the hoistway 2. As the reference marker 16, for example, a plate or a switch may be used. In order to increase compensation accuracy of the position information S4, the reference marker 16 is desirably near the bottom floor separated from the suspension position of the code tape 11. A reason therefor will be described in detail later with reference to FIGS. 4A and 4B.

Figure 3:
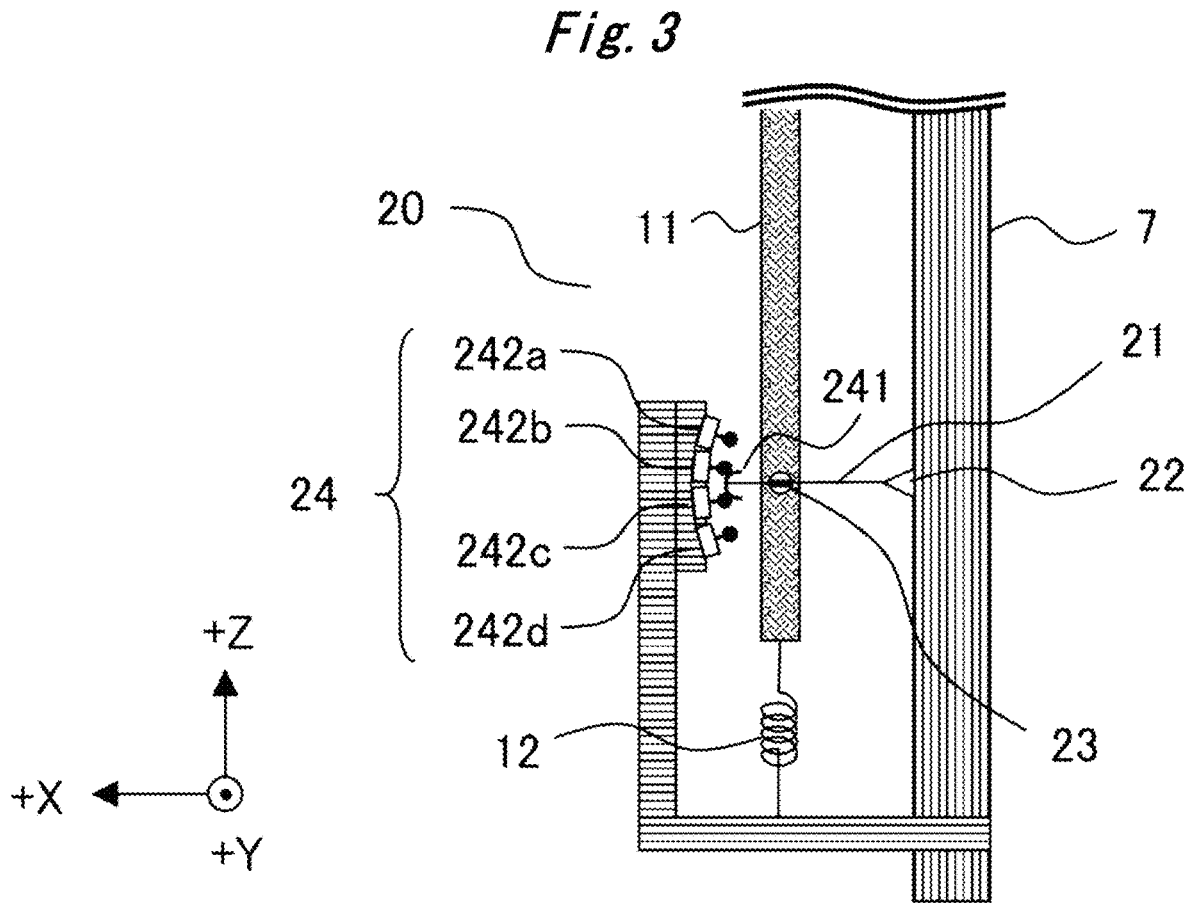
FIG. 3 is a diagram showing an example of a configuration of a code tape elongation/contraction detection unit according to the first embodiment.

The code tape elongation/contraction detection unit 20 detects the amount of elongation or contraction S5 of the code tape 11. Specifically, the code tape elongation/contraction detection unit 20 detects the amount of elongation or contraction S5 of the code tape 11 by operations of elongation/contraction detection switches 242a to 242d (to be described later). FIG. 3 is a diagram showing an example of a configuration of the code tape elongation/contraction detection unit 20 according to the first embodiment. The code tape elongation/contraction detection unit 20 includes an elongation/contraction detection rod 21, a rail-side support point 22, a code tape-side support point 23, and an angle detection unit 24.

One end of the elongation/contraction detection rod 21 is supported by the rotatable rail-side support point 22 being fixed to the rail 7, and the angle detection unit 24 is fixed to another end of the elongation/contraction detection rod 21. The elongation/contraction detection rod 21 is supported by the code tape-side support point 23 which constrains the elongation/contraction detection rod 21 between the one end and the other end in a vertical direction (X-axis direction) with respect to the code tape 11. In other words, when the code tape 11 elongates or contracts in the Z-axis direction, the elongation/contraction detection rod 21 rotates instead of moving in the Z-axis direction. Note that one end of the elongation/contraction detection rod 21 may be supported by a rotatable support point fixed at an arbitrary position of the hoistway 2. However, by having one end supported by the rail-side support point 22, a positional relationship between the elongation/contraction detection rod 21 and the code tape 11 can be accurately comprehended when the code tape 11 is suspended by the rail 7.

In the first embodiment, the angle detection unit 24 is constituted of a switch block 241 and elongation/contraction detection switches 242a to 242d.

The switch block 241 is fixed to the other end of the elongation/contraction detection rod 21 and, due to a rotation of the elongation/contraction detection rod 21, the switch block 241 performs an arc motion along the elongation/contraction detection switches 242a to 242d. When the code tape 11 elongates, the switch block 241 moves in the −Z direction due to a rotation of the elongation/contraction detection rod 21. When the code tape 11 contracts, the switch block 241 moves in the +Z direction due to a rotation of the elongation/contraction detection rod 21 in an opposite direction. The switch block 241 is initially adjusted to be arranged at an intermediate position of the elongation/contraction detection switches 242b and 242c after installation or maintenance is completed and upon the start of operation of the elevator device 1. Note that a member included in the switch block 241 limits the switch block 241 from moving in the +Z direction more than the elongation/contraction detection switch 242a. In a similar manner, the switch block 241 is limited from moving in the −Z direction more than the elongation/contraction detection switch 242d. For example, when the switch block 241 comes into contact with the elongation/contraction detection switch 242a and the elongation/contraction detection switch 242a is pressed, the elongation/contraction detection switch 242a continues to be pressed even when the code tape 11 further contracts. In a similar manner, when the switch block 241 comes into contact with the elongation/contraction detection switch 242d and the elongation/contraction detection switch 242d is pressed, the elongation/contraction detection switch 242d continues to be pressed even when the code tape 11 further elongates.

The elongation/contraction detection switches 242a to 242d are operated due to contact by the switch block 241. In other words, when the switch block 241 moves in the +Z direction, the switch block 241 comes into contact with the elongation/contraction detection switch 242a or 242b and the elongation/contraction detection switch 242a or 242b is pressed. When the switch block 241 moves in the −Z direction, the switch block 241 comes into contact with the elongation/contraction detection switch 242c or 242d and the elongation/contraction detection switch 242c or 242d is pressed. On the other hand, when the switch block 241 does not move, since the switch block 241 remains arranged at the intermediate position of the elongation/contraction detection switches 242b and 242c, none of the elongation/contraction detection switches are pressed. Whether or not the elongation/contraction detection switches 242a to 242d are pressed is sequentially output to the control unit 10 as the amount of elongation or contraction S5. Note that the elongation/contraction detection switches 242a to 242d are installed separated from each other and the amount of elongation or contraction S5 of the code tape 11 can be acquired at a timing where any of the elongation/contraction detection switches 242a to 242d is pressed.

The elongation/contraction detection switches 242a to 242d are installed at positions where the elongation/contraction detection switches 242a to 242d are pressed before an error between an actual position of the car 3 and the position information S4 from the code read sensor 13 becomes an issue. For example, the elongation/contraction detection switches 242b and 242c are installed at positions where the elongation/contraction detection switches 242b and 242c are pressed before a step difference upon landing at each floor becomes an issue. For example, the elongation/contraction detection switches 242a and 242d are installed at positions where unintended door open-travel protection does not occur. Door open-travel protection refers to a function which detects travel by the car 3 while the car door 8 and the hatch door 9 are open and which stops the car 3. Note that the number of elongation/contraction detection switches to be installed is not limited to the four elongation/contraction detection switches 242a to 242d described herein and may be four or more. Accordingly, the error between the actual position of the car 3 and the position information S4 from the code read sensor 13 can be finely classified into two or more stages.

Figure 4A:
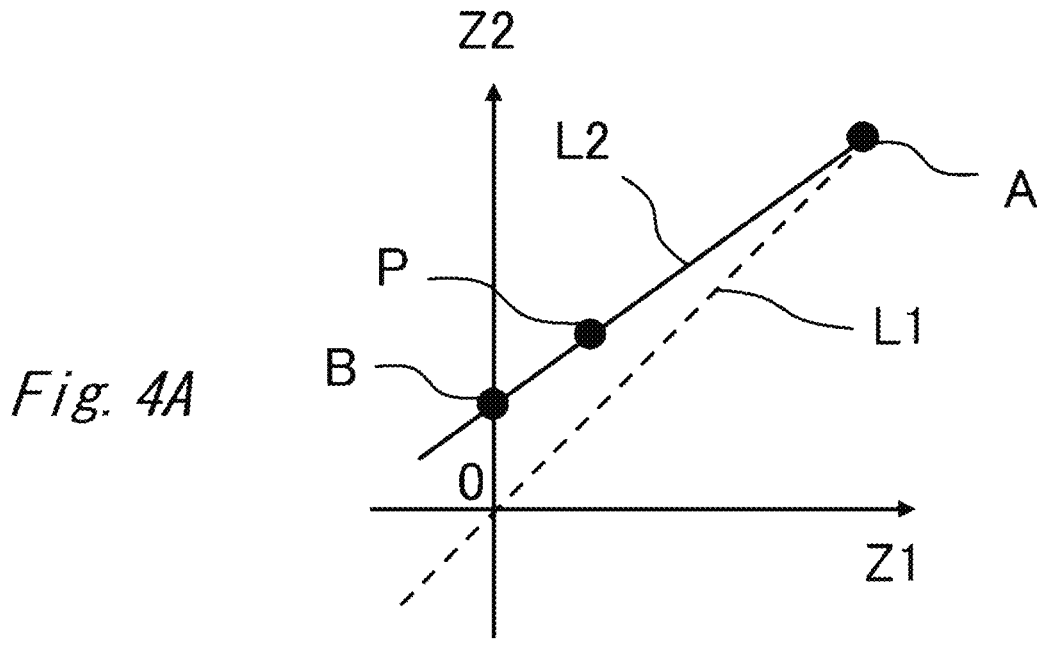
FIG. 4A is a graph showing a relationship between an actual position of a car when a reference position is set as an origin and a position calculated from a code read sensor according to the first to third embodiments.

Next, a method of calculating the compensatory position information will be described with reference to FIGS. 4A and 4B. FIGS. 4A and 4B are graphs showing a relationship between the actual position of the car 3 when a reference position is set as an origin and a position calculated from the code read sensor according to the first embodiment. In FIG. 4A, a dotted line LI represents a relationship in a case where the code tape 11 neither elongates nor contracts and a solid line L2 represents a relationship in a case where the code tape 11 elongates. In FIG. 4B, a dotted line L3 represents a relationship in a case where the code tape 11 neither elongates nor contracts and a solid line L4 represents a relationship in a case where the code tape 11 contracts. An abscissa represents an actual position Z1 and an ordinate represents a position Z2 read from the code read sensor 13.

In FIG. 4A, the dotted line L1 is a straight line which passes through a suspension position A where positions Z1 and Z2 are equal to each other and the origin. On the other hand, the solid line L2 is a straight line which passes through the suspension position A and an actual reference position B. When coordinates at the position B are denoted as $(Z1_B, Z2_B)$, $Z1_B=0$ and $Z2_B>0$ are satisfied. In this case, a divergence occurs between the actual position of the car 3 and the position calculated from the code read sensor 13. In consideration thereof, by obtaining a straight-line equation of the solid line L2 based on coordinates $(Z1_A, Z2_A)$ at the suspension position A and coordinates $(Z1_B, Z2_B)$ at the position B, the control unit 10 can calculate compensatory position information. Since the suspension position A represents suspension from a support part fixed in advance, the coordinates $(Z1_A, Z2_A)$ at the suspension position A are known. In addition, by moving the car 3 to a reference position in accordance with the detection result of a reference sensor 15 or, in other words, the reference marker detection signal S3, and causing the code read sensor 13 to acquire the position information S4, the coordinates $(Z1_B, Z2_B)$ at the position B also become known. Therefore, the straight-line equation of the solid line L2 can be obtained. Specifically, when coordinates of an arbitrary position P on the solid line L2 is denoted as $(Z1_P, Z2_P)$, $Z1_P$ being the compensatory position information is calculated based on $Z2_P$ acquired by the code read sensor 13 and the straight-line equation of the solid line L2.

In FIG. 4B, the dotted line L3 is a straight line which passes through a suspension position C where positions Z1 and Z2 are equal to each other and the origin. On the other hand, the solid line L4 is a straight line which passes through the suspension position C and an actual reference position D. When coordinates at the position D are denoted as $(Z1_D, Z2_D)$, $Z1_D=0$ and $Z2_D<0$ are satisfied. In this case, a divergence occurs between the actual position of the car 3 and the position calculated from the code read sensor 13. In consideration thereof, by obtaining a straight-line equation of the solid line L4 based on coordinates $(Z1_C, Z2_C)$ at the suspension position C and coordinates $(Z1_D, Z2_D)$ at the position D, the control unit 10 can calculate compensatory position information. Since the suspension position C represents suspension from a support part fixed in advance, the coordinates $(Z1_C, Z2_C)$ at the suspension position C are known. In addition, by moving the car 3 to a reference position in accordance with a detection result of the reference sensor 15 or, in other words, the reference marker detection signal S3 and causing the code read sensor 13 to acquire the position information S4, the coordinates $(Z1_D, Z2_D)$ at the position D also become known. Therefore, the straight-line equation of the solid line L4 can be obtained. Specifically, when coordinates of an arbitrary position Q on the solid line L4 is denoted as $(Z1_Q, Z2_Q)$, $Z1_Q$ being the compensatory position information is calculated based on $Z2_Q$ acquired by the code read sensor 13 and the straight-line equation of the solid line L4.

In FIG. 4A, a distance between the suspension position A and the reference position is desirably large. The reason therefor is to increase accuracy when obtaining the straight-line equation of the solid line L2. In order to increase the distance, the reference marker 16 to be installed at the reference position is preferably near the bottom floor separated from the suspension position A of the code tape 11. A similar situation applies to FIG. 4B.

FIG. 5 is a flow chart showing an example of a procedure of control of the car 3 according to the first embodiment.

As shown in FIG. 5, when the control of the car 3 starts, the control unit 10 performs initial adjustment of the car 3 (step ST1). At this point, the initial adjustment involves arranging the switch block 241 at the intermediate position of the elongation/contraction detection switches 242b and 242c. Note that the control of the car 3 may be started once a temperature at which elongation or contraction of the code tape 11 do not occur is reached.

The control unit 10 causes travel of the car 3 to be continued (step ST2). In other words, the control unit 10 outputs the torque signal S1 to the traction machine 6 so as to continue travel of the car 3. The control unit 10 causes travel of the car 3 to be performed using the compensatory position information calculated in step ST9 or compensatory position information manually calculated in advance prior to the start of the flow shown in FIG. 5. Both cases will be described later.

The control unit 10 judges whether or not the elongation/contraction detection switch 242a or 242d has been pressed (step ST3). The judgment of step ST3 corresponds to a judgment as to whether or not an error between an actual position of the car 3 and the position information S4 from the code read sensor 13 becomes excessively large and unintended door open-travel protection occurs.

When the judgment of step ST3 is "Yes", the processing advances to step ST4. When the judgment of step ST3 is "No", the processing advances to step ST6.

When the judgment of step ST3 is "Yes", the control unit 10 pauses the travel of the car 3 (step ST4). In other words, the control unit 10 outputs the torque signal S1 to the traction machine 6 so as to pause the travel of the car 3. While the compensatory position information can also be calculated after moving the car 3 to the reference position, when the error between the actual position of the car 3 and the position information S4 from the code read sensor 13 is excessively large, moving the car 3 to the reference position may adversely affect speed control which is performed concurrently with position control. In addition, since a quantization error of the code read sensor 13 is not as estimated, control may become unstable. Therefore, the car 3 is paused instead of being allowed to travel.

The control unit 10 judges whether or not the elongation/contraction detection switch 242a or 242d has been separated (step ST5).

When the judgment of step ST5 is "Yes", the processing advances to step ST10. When the judgment of step ST5 is "No", the processing returns to step ST4 and the pause of the travel of the car 3 is continued. A case where the judgment of step ST5 is "Yes" is a case where the error between the actual position of the car 3 and the position information S4 from the code read sensor 13 becomes small and the switch block 241 moves toward a position at the time of initial adjustment in step ST1.

When the judgment of step ST3 is "No", the control unit 10 judges whether or not a state has changed from the last time compensatory position information was calculated (step ST6). For example, let us assume that the compensatory position information was last calculated by pressing the elongation/contraction detection switch 242b. When the elongation/contraction detection switch 242c is pressed or when none of the elongation/contraction detection switches are pressed this time, it is assumed that the state has changed from the last time and a judgment of "Yes" is made in step ST6. Conversely, when it is judged that the elongation/contraction detection switch 242b is pressed this time, it is assumed that the state has not changed from the last time and a judgment of "No" is made in step ST6. Note that, when the judgment of step ST6 is a first-time judgment, a judgment is made as to whether or not the elongation/contraction detection switch 242b or 242c has been pressed. The judgment of step ST6 corresponds to judging whether or not the amount of elongation or contraction S5 from the last time the compensatory position information was calculated is equal to or larger than a predetermined amount. In addition, the judgment of step ST6 corresponds to judging whether or not an error upon landing at each floor poses a problem.

When the judgment of step ST6 is "Yes", the processing advances to step ST7. When the judgment of step ST6 is "No", the processing advances to step ST10.

When the judgment of step ST6 is "Yes", the control unit 10 moves the car 3 to the reference position in accordance with a detection result from the reference sensor 15 or, in other words, the reference marker detection signal S3 (step ST7).

The control unit 10 causes the code read sensor 13 to read the position information S4 at the reference position of the car 3 as reference position information (step ST8).

The control unit 10 calculates the compensatory position information with respect to an arbitrary position (step ST9). Specifically, the control unit 10 calculates the compensatory position information using the method described with reference to FIGS. 4A and 4B. For example, let us assume that the car 3 is traveling at a position P at a given timing in FIG. 4A. In addition, when a position $Z2_P$ is acquired by the code read sensor 13, the control unit 10 calculates $Z1_P$ being the compensatory position information and controls the car 3 using the compensatory position information.

The control unit 10 judges whether or not the travel of the car 3 is to be continued (step ST10).

When the judgment of step ST10 is "Yes", the processing returns to step ST2 and the travel of the car 3 is continued. When the judgment of step ST10 is "No", the control of the car 3 is completed. A case where the control of the car 3 is completed is a case where, for example, maintenance of the elevator device 1 is performed.

Note that, when "No" continues in step ST5, the control of the car 3 may be completed by force, the compensatory position information of the car 3 may be manually calculated as a part of the maintenance of the elevator device 1, and the flow of FIG. 5 may be started once again.

According to the first embodiment described above, since the compensatory position information is calculated based on reference position information when the amount of elongation or contraction S5 of the code tape 11 from the last time the compensatory position information was calculated becomes equal to or larger than a predetermined amount, even when the code tape elongates or contracts due to changes in temperature, accurate position control of the car 3 can be performed without increasing the number of installed reference markers 16.

Second Embodiment

Figure 6:
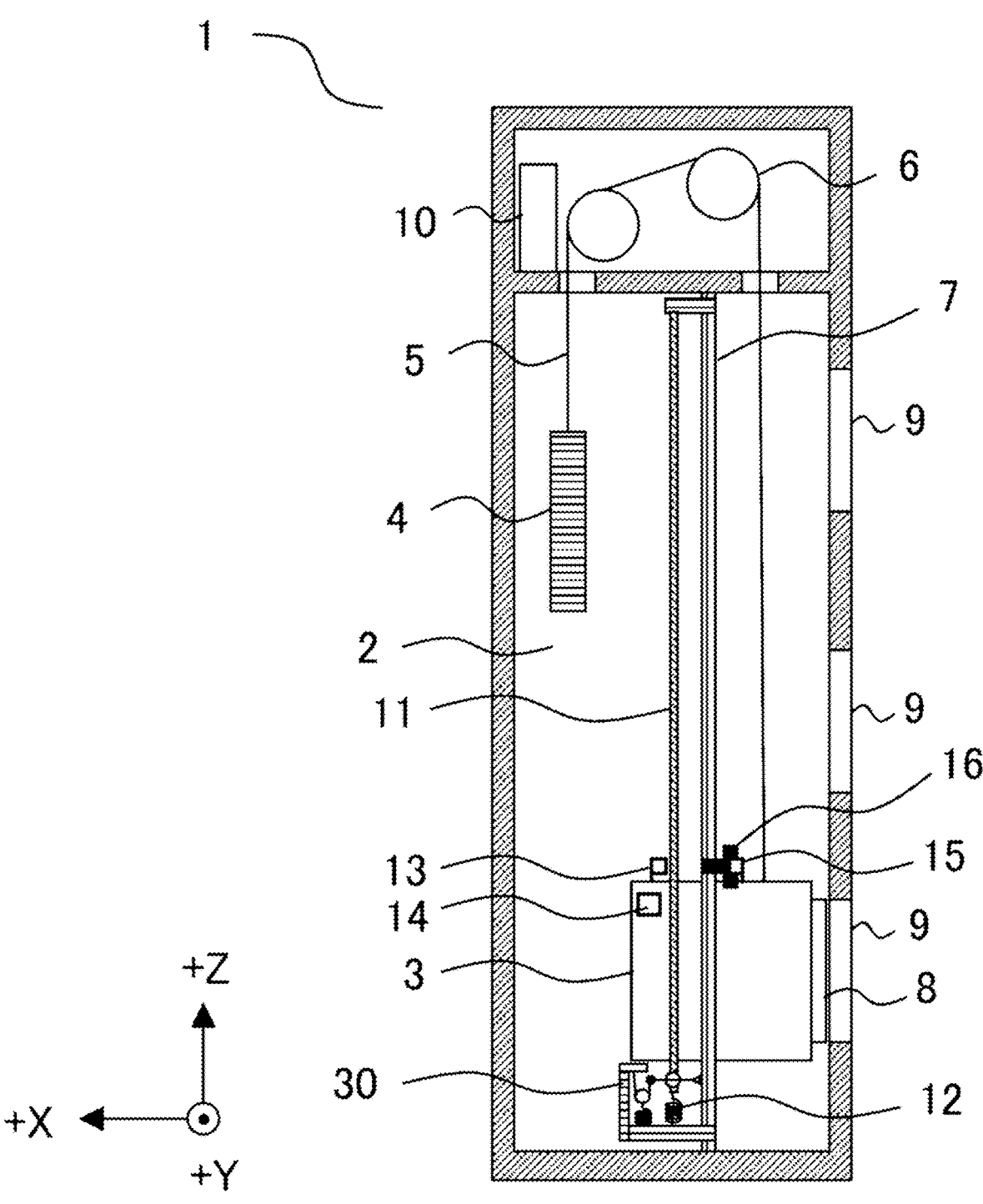
FIG. 6 is a diagram showing an example of a configuration of the elevator device according to the second embodiment.

FIG. 6 is a diagram showing an example of a configuration of the elevator device 1 according to the second embodiment. FIG. 6 differs from FIG. 2 in that a code tape elongation/contraction detection unit 30 is provided in place of the code tape elongation/contraction detection unit 20. Since FIG. 6 is the same as the FIG. 2 with the exception of the code tape elongation/contraction detection unit 30, a description of same parts will be omitted. Note that the block diagram in FIG. 1 is also used in the second embodiment.

The code tape elongation/contraction detection unit 30 detects the amount of elongation or contraction S5 of the code tape 11. Specifically, the code tape elongation/contraction detection unit 30 detects the amount of elongation or contraction S5 of the code tape 11 using an angle detected by an elongation/contraction detection encoder 344 to be described later. FIG. 7 is a diagram showing an example of a configuration of the code tape elongation/contraction detection unit 30 according to the second embodiment. The code tape elongation/contraction detection unit 30 includes an elongation/contraction detection rod 31, a rail-side support point 32, a code tape-side support point 33, and an angle detection unit 34. Since the elongation/contraction detection rod 31, the rail-side support point 32, and the code tape-side support point 33 are, respectively, the same as the elongation/contraction detection rod 21, the rail-side support point 22, and the code tape-side support point 23 shown in FIG. 3, a description thereof will be omitted.

In the second embodiment, the angle detection unit 34 which supports another end of the elongation/contraction detection rod 31 is constituted of an elongation/contraction detection wire 341, an elongation/contraction detection pulley 342, a wire tension spring 343, and the elongation/contraction detection encoder 344.

One end of the elongation/contraction detection wire 341 is fixed to the elongation/contraction detection rod 31 and another end is fixed to a member installed in the hoistway 2. The elongation/contraction detection wire 341 between one end and the other end thereof is hung on the elongation/contraction detection pulley 342.

Tension is imparted to the elongation/contraction detection pulley 342 by having one end thereof fixed to the wire tension spring 343 installed in the hoistway 2. When the elongation/contraction detection rod 31 rotates due to elongation or contraction of the code tape 11, the elongation/contraction detection pulley 342 also rotates.

The elongation/contraction detection encoder 344 is installed on a same shaft as the elongation/contraction detection pulley 342 and detects an angle of rotation of the elongation/contraction detection pulley 342.

The angle detection unit 34 may be solely constituted of the elongation/contraction detection encoder 344. In other words, the elongation/contraction detection encoder 344 may be fixed to the other end of the elongation/contraction detection rod 31. In this case, the elongation/contraction detection encoder 344 detects an angle of rotation of the elongation/contraction detection rod 31.

In addition, the elongation/contraction detection wire 341 may be fixed to an end of the code tape 11 and the elongation/contraction detection wire 341 may be hung on the elongation/contraction detection pulley 342. In this case, the elongation/contraction detection pulley 342 rotates due to elongation or contraction of the code tape 11 and an angle of rotation of the elongation/contraction detection pulley 342 is detected by the elongation/contraction detection encoder 344 installed on the same shaft as the elongation/contraction detection pulley 342. Accordingly, the code tape elongation/contraction detection unit 30 need only be equipped with the elongation/contraction detection wire 341, the elongation/contraction detection pulley 342, and the elongation/contraction detection encoder 344, and the elongation/contraction detection rod 31 and the code tape tension spring 12 become unnecessary.

As described above, since the angle detection unit 34 is solely constituted of the elongation/contraction detection encoder 344, a simple device configuration is achieved. A simple device configuration is similarly achieved when the code tape elongation/contraction detection unit 30 is equipped with the elongation/contraction detection wire 341, the elongation/contraction detection pulley 342, and the elongation/contraction detection encoder 344. However, adopting the device configuration shown in FIG. 7 enables the amount of elongation or contraction S5 to be accurately detected even with respect to a minute elongation or contraction of the code tape 11.

Figure 8:
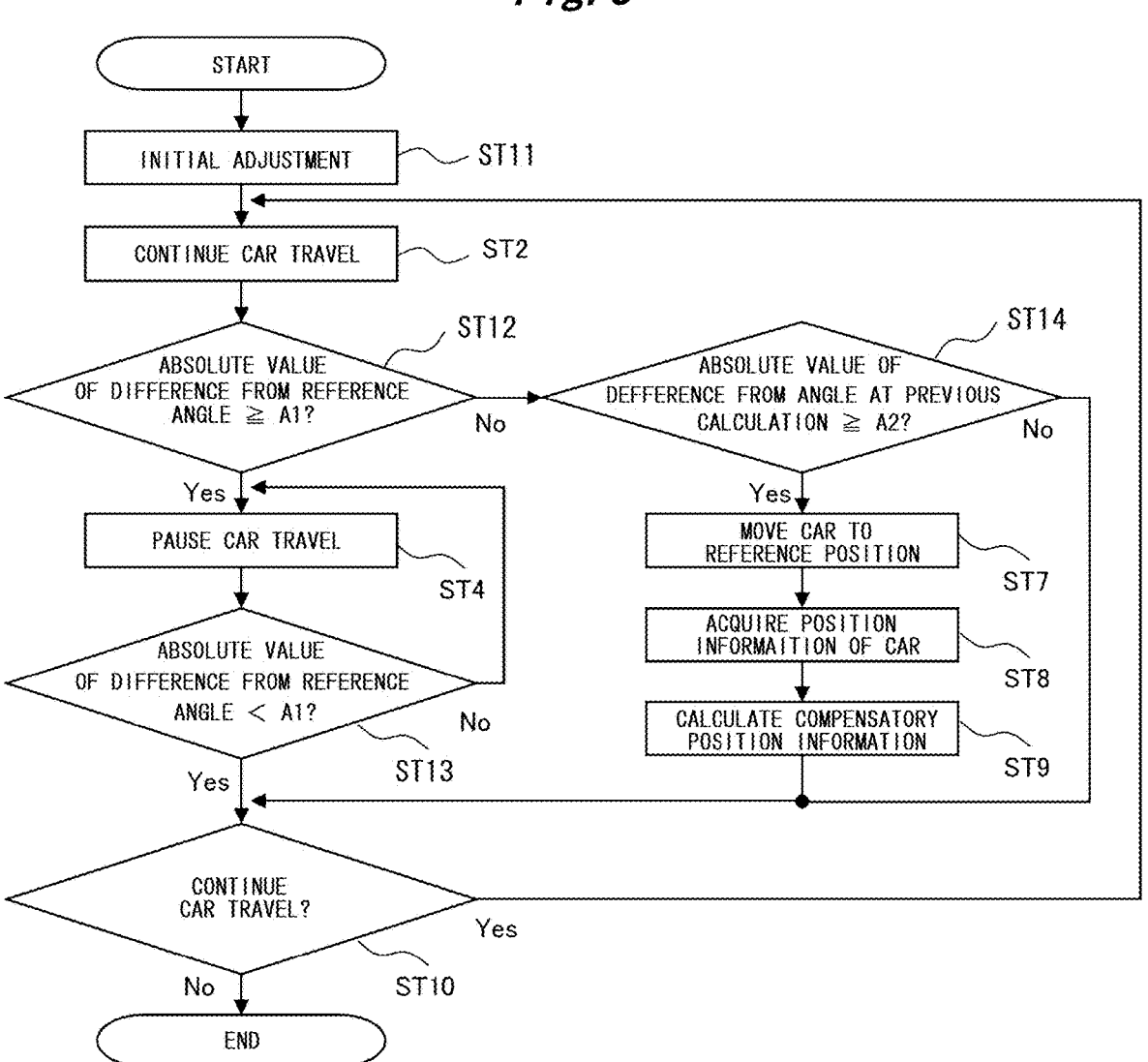
FIG. 8 is a flow chart showing an example of a procedure of control of a car according to the second embodiment.

FIG. 8 is a flow chart showing an example of a procedure of control of the car 3 according to the second embodiment. Since steps ST2 to ST10 in FIG. 8 are the same as steps ST2 to ST10 in FIG. 5, a detailed description thereof will be omitted.

As shown in FIG. 8, when the control of the car 3 starts, the control unit 10 performs initial adjustment of the car 3 (step ST11). In this case, the initial adjustment involves initializing the elongation/contraction detection encoder 344. Hereafter, an angle at the time of initialization will be referred to as a "reference angle". Note that the control of the car 3 may be started once a temperature at which elongation or contraction of the code tape 11 do not occur is reached.

The control unit 10 causes travel of the car 3 to be continued (step ST2).

The control unit 10 causes the elongation/contraction detection encoder 344 to acquire an angle and judges whether or not an absolute value of a difference between the acquired angle and the reference angle is equal to or larger than A1 (step ST12). The judgment of step ST12 corresponds to a judgment as to whether or not an error between the actual position of the car 3 and the position information S4 from the code read sensor 13 becomes excessively large and unintended door open-travel protection occurs. A1 is a value obtained by converting an error at which unintended door open-travel protection does not occur into an angle according to the elongation/contraction detection encoder 344.

When the judgment of step ST12 is "Yes", the processing advances to step ST4. When the judgment of step ST12 is "No", the processing advances to step ST14.

When the judgment of step ST12 is "Yes", the control unit 10 pauses the travel of the car 3 (step ST4).

The control unit 10 causes the elongation/contraction detection encoder 344 to acquire an angle and judges whether or not an absolute value of a difference between the acquired angle and the reference angle is smaller than A1 (step ST13).

When the judgment of step ST13 is "Yes", the processing advances to step ST10. When the judgment of step ST13 is "No", the processing returns to step ST4 and the pause of the travel of the car 3 is continued. A judgment of "Yes" in step ST13 means that the error between the actual position of the car 3 and the position information S4 from the code read sensor 13 decreases.

When the judgment of step ST12 is "No", the control unit 10 causes the elongation/contraction detection encoder 344 to acquire an angle and judges whether or not an absolute value of a difference from an angle at the last time the compensatory position information was calculated is equal to or larger than A2 (step ST14). When the judgment of step ST14 is a first-time judgment, a judgment is made as to whether or not an absolute value of a difference between the angle of the elongation/contraction detection encoder 344 and the reference angle is equal to or larger than A2. The judgment of step ST14 corresponds to judging whether or not the amount of elongation or contraction S5 from the last time the compensatory position information was calculated is equal to or larger than a predetermined amount. In addition, the judgment of step ST14 corresponds to judging whether or not an error upon landing at each floor poses a problem. A2 is a value obtained by converting the error into an angle according to the elongation/contraction detection encoder 344. Furthermore, A2 is a value smaller than A1.

When the judgment of step ST14 is "Yes", the processing advances to step ST7. When the judgment of step ST14 is "No", the processing advances to step ST10.

When the judgment of step ST14 is "Yes", the control unit 10 moves the car 3 to the reference position in accordance with a detection result from the reference sensor 15 or, in other words, the reference marker detection signal S3 (step ST7).

The control unit 10 causes the code read sensor 13 to read the position information S4 at the reference position of the car 3 as reference position information (step ST8).

The control unit 10 calculates compensatory position information with respect to an arbitrary position (step ST9).

The control unit 10 judges whether or not the travel of the car 3 is to be continued (step ST10).

When the judgment of step ST10 is "Yes", the processing returns to step ST2 and the travel of the car 3 is continued. When the judgment of step ST10 is "No", the control of the car 3 is completed.

Note that, when "No" continues in step ST13, the control of the car 3 may be completed by force, the compensatory position information of the car 3 may be manually calculated as a part of the maintenance of the elevator device 1, and the flow of FIG. 8 may be started once again.

FIG. 9 is a flow chart showing another example of the procedure of the control of the car 3 according to the second embodiment. While the amount of elongation or contraction S5 of the code tape 11 is acquired in the first embodiment at a timing where the elongation/contraction detection switches 242a to 242d are pressed, in the second embodiment, the amount of elongation or contraction S5 of the code tape 11 can be calculated in real time by acquiring an angle with the elongation/contraction detection encoder 344. Accordingly, the compensatory position information can be calculated in real time without moving the car 3 to the reference position. Therefore, the need of processing of steps ST4, ST7, ST8, ST12, and ST13 in FIG. 8 can be eliminated. In this case, the control unit 10 calculates the compensatory position information based on the position information S4 of the car 3 which is determined based on the code of the code tape 11 and the amount of elongation or contraction S5 of the code tape 11, and controls the car 3 using the compensatory position information. Since steps ST2, ST9 to ST11, and ST14 in FIG. 9 are the same as steps ST2, ST10, ST11, and ST14 in FIG. 8, a detailed description thereof will be omitted.

As shown in FIG. 9, when the control of the car 3 starts, the control unit 10 performs initial adjustment of the car 3 (step ST11).

The control unit 10 causes travel of the car 3 to be continued (step ST2).

The control unit 10 causes the elongation/contraction detection encoder 344 to acquire an angle and judges whether or not an absolute value of a difference between the acquired angle and the reference angle is equal to or larger than A2 (step ST14).

When the judgment of step ST14 is "Yes", the processing advances to step ST15. When the judgment of step ST14 is "No", the processing advances to step ST10.

When the judgment of step ST14 is "Yes", the control unit 10 calculates the compensatory position information with respect to an arbitrary position (step ST15). A calculation method of the compensatory position information in step ST15 differs from the calculation method of the compensatory position information in step ST9 in FIG. 8. In step ST9, for example, in FIG. 4A, the compensatory position information is calculated by obtaining a straight-line equation of the solid line L2 based on coordinates $(Z1_A, Z2_A)$ at the suspension position A and coordinates $(Z1_B, Z2_B)$ at the position B. By comparison, in step ST15, for example, in FIG. 4A, the compensatory position information is calculated by obtaining a straight-line equation of the solid line L2 based on the coordinates $(Z1_A, Z2_A)$ at the suspension position A and a gradient of the solid line L2. In the second embodiment, since an amount of elongation or contraction S5 of the code tape 11 can be calculated by acquiring an angle with the elongation/contraction detection encoder 344, the gradient of the solid line L2 becomes known. For example, let us assume that the car 3 is traveling at a position P at a given timing in FIG. 4A. In addition, when a position $Z2_P$ is acquired by the code read sensor 13, the control unit 10 calculates $Z1_P$ being the compensatory position information and controls the car 3 using the compensatory position information.

The control unit 10 judges whether or not the travel of the car 3 is to be continued (step ST10).

When the judgment of step ST10 is "Yes", the processing returns to step ST2 and the travel of the car 3 is continued. When the judgment of step ST10 is "No", the control of the car 3 is completed.

Note that the compensatory position information may always be calculated in step ST15 regardless of whether the judgment of step ST14 is "Yes" or "No".

According to the second embodiment described above, since the compensatory position information of the car 3 is calculated based on an angle acquired by the elongation/contraction detection encoder 344, even when the code tape elongates or contracts due to changes in temperature, accurate position control of the car 3 can be performed without increasing the number of installed reference markers 16.

Third Embodiment

Figure 10:
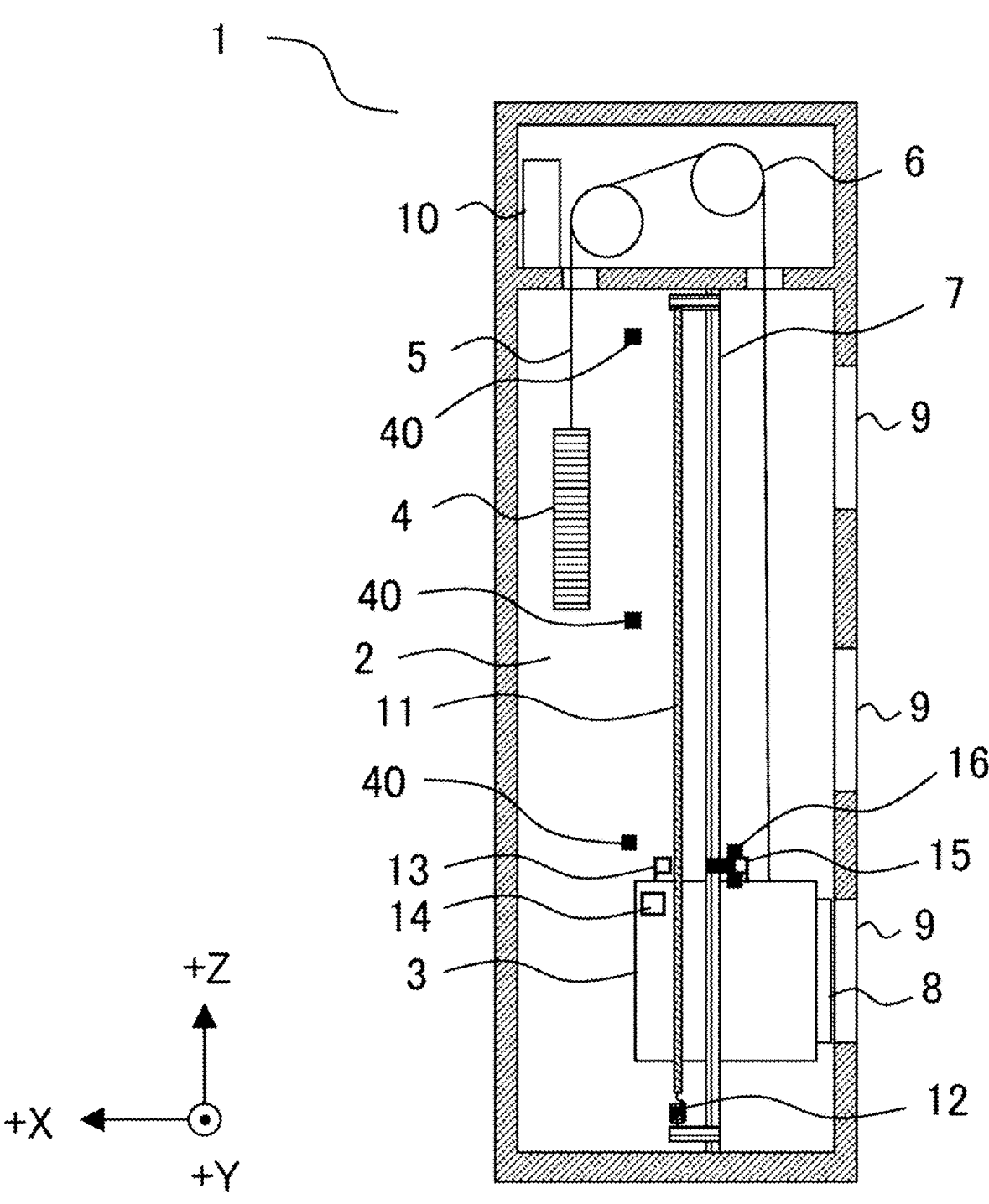
FIG. 10 is a diagram showing an example of a configuration of the elevator device according to the third embodiment.

FIG. 10 is a diagram showing an example of a configuration of the elevator device 1 according to the third embodiment. FIG. 10 differs from FIG. 6 in that a code tape elongation/contraction detection unit 40 is provided in place of the code tape elongation/contraction detection unit 30. Since FIG. 10 is the same as the FIG. 6 with the exception of the code tape elongation/contraction detection unit 40, a description of same parts will be omitted. Note that the block diagram in FIG. 1 is also used in the third embodiment.

The code tape elongation/contraction detection unit 40 is a thermometer provided in the hoistway 2 and detects the amount of elongation or contraction S5 of the code tape 11 in accordance with the temperature measured by the thermometer. As shown in FIG. 10, the thermometer is installed in plurality at different positions of the hoistway 2 and measures the temperature of the hoistway 2. Since the code tape 11 elongates or contracts due to a temperature fluctuation, the amount of elongation or contraction S5 can be calculated based on the temperature measured by the code tape elongation/contraction detection unit 40. While the amount of elongation or contraction S5 of the code tape 11 is directly detected in the first and second embodiments using the angle detection units 24 and 34, in the present embodiment, the amount of elongation or contraction S5 of the code tape 11 can be detected with a simple configuration using only a thermometer. Although only one thermometer may be installed in the hoistway 2, installing the thermometer in plurality enables the position information S4 to be accurately compensated for even when the code tape 11 locally elongates or contracts.

Figure 11:
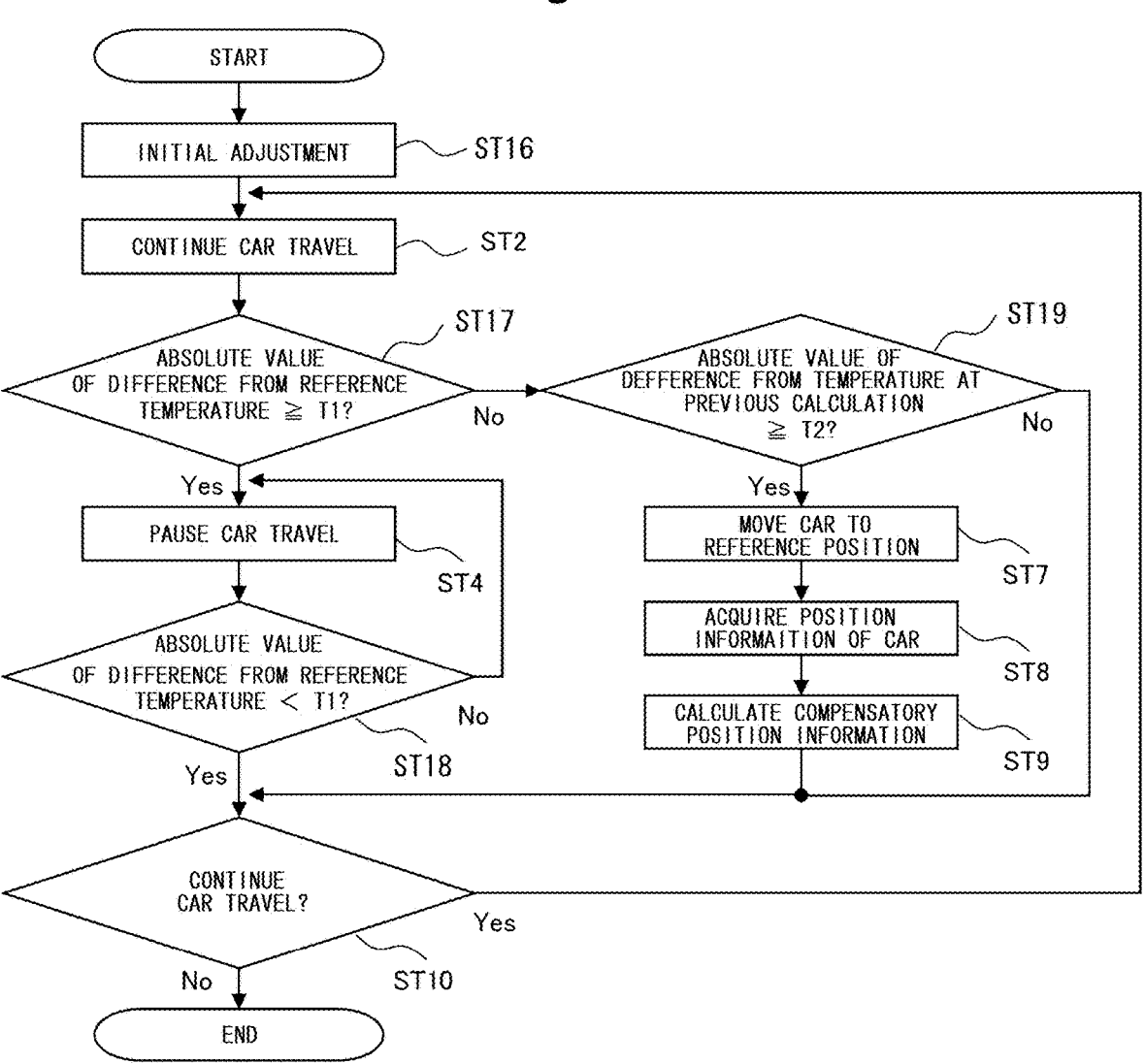
FIG. 11 is a flow chart showing an example of a procedure of control of a car according to the third embodiment.

FIG. 11 is a flow chart showing an example of a procedure of control of the car 3 according to the third embodiment. Since steps ST2, ST4, and ST7 to ST10 in FIG. 11 are the same as steps ST2, ST4, and ST7 to ST10 in FIG. 8, a detailed description thereof will be omitted.

As shown in FIG. 11, when the control of the car 3 starts, the control unit 10 performs initial adjustment of the car 3 (step ST16). In this case, the initial adjustment involves acquiring a temperature with the thermometer and adopting the temperature at this time as a "reference temperature". Note that the control of the car 3 may be started once a temperature at which elongation or contraction of the code tape 11 do not occur is reached.

The control unit 10 causes travel of the car 3 to be continued (step ST2).

The control unit 10 causes the thermometer to acquire a temperature and judges whether or not an absolute value of a difference between the acquired temperature and the reference temperature is equal to or larger than T1 (step ST17). The judgment of step ST17 corresponds to a judgment as to whether or not an error between an actual position of the car 3 and the position information S4 from the code read sensor 13 becomes excessively large and unintended door open-travel protection occurs. T1 is a value obtained by converting an error at which unintended door open-travel protection does not occur into a temperature.

When the judgment of step ST17 is "Yes", the processing advances to step ST4. When the judgment of step ST17 is "No", the processing advances to step ST19.

When the judgment of step ST17 is "Yes", the control unit 10 pauses the travel of the car 3 (step ST4).

The control unit 10 causes the thermometer to acquire a temperature and judges whether or not an absolute value of a difference between the acquired temperature and the reference temperature is smaller than T1 (step ST18).

When the judgment of step ST18 is "Yes", the processing advances to step ST10. When the judgment of step ST18 is "No", the processing returns to step ST4 and the pause of the travel of the car 3 is continued.

When the judgment of step ST17 is "No", the control unit 10 causes the thermometer to acquire a temperature and judges whether or not an absolute value of a difference from a temperature at the last time compensatory position information was calculated is equal to or larger than T2 (step ST19). When the judgment of step ST19 is a first-time judgment, a judgment is made as to whether or not an absolute value of a difference between the temperature of the thermometer and the reference temperature is equal to or larger than T2. The judgment of step ST19 corresponds to judging whether or not the amount of elongation or contraction S5 from the last time the compensatory position information was calculated is equal to or larger than a predetermined amount. In addition, the judgment of step ST19 corresponds to judging whether or not an error upon landing at each floor poses a problem. T2 is a value obtained by converting the error into a temperature. Furthermore, T2 is a value smaller than T1.

When the judgment of step ST19 is "Yes", the processing advances to step ST7. When the judgment of step ST19 is "No", the processing advances to step ST10.

When the judgment of step ST19 is "Yes", the control unit 10 moves the car 3 to the reference position in accordance with a detection result from the reference sensor 15 or, in other words, the reference marker detection signal S3 (step ST7).

The control unit 10 causes the code read sensor 13 to read the position information S4 at the reference position of the car 3 as reference position information (step ST8).

The control unit 10 calculates the compensatory position information with respect to an arbitrary position (step ST9).

The control unit 10 judges whether or not the travel of the car 3 is to be continued (step ST10).

When the judgment of step ST10 is "Yes", the processing returns to step ST2 and the travel of the car 3 is continued. When the judgment of step ST10 is "No", the control of the car 3 is completed.

Note that, when "No" continues in step ST18, the control of the car 3 may be completed by force, the compensatory position information of the car 3 may be manually calculated as a part of the maintenance of the elevator device 1, and the flow of FIG. 11 may be started once again.

FIG. 12 is a flow chart showing another example of the procedure of the control of the car 3 according to the third embodiment. In the third embodiment, the amount of elongation or contraction S5 of the code tape 11 can be calculated in real time in a similar manner to the second embodiment by acquiring a temperature with a thermometer.

15

Accordingly, the compensatory position information can be calculated in real time without moving the car 3 to the reference position. Therefore, the need of processing of steps ST4, ST7, ST8, ST17, and ST18 in FIG. 11 can be eliminated. In this case, the control unit 10 calculates the compensatory position information based on the position information S4 of the car 3 which is determined based on the code of the code tape 11 and the amount of elongation or contraction S5 of the code tape 11, and controls the car 3 using the compensatory position information. Since steps ST2, ST10, ST15, ST16, and ST19 in FIG. 12 are the same as steps ST2, ST10, ST15, ST16, and ST19 in FIG. 11, a detailed description thereof will be omitted.

As shown in FIG. 12, when the control of the car 3 starts, the control unit 10 performs initial adjustment of the car 3 (step ST16).

The control unit 10 causes travel of the car 3 to be continued (step ST2).

The control unit 10 causes the thermometer to acquire a temperature and judges whether or not an absolute value of a difference between the acquired temperature and the reference temperature is equal to or larger than T2 (step ST19).

When the judgment of step ST19 is "Yes", the processing advances to step ST15. When the judgment of step ST19 is "No", the processing advances to step ST10.

When the judgment of step ST19 is "Yes", the control unit 10 calculates the compensatory position information with respect to an arbitrary position (step ST15).

The control unit 10 judges whether or not the travel of the car 3 is to be continued (step ST10).

When the judgment of step ST10 is "Yes", the processing returns to step ST2 and the travel of the car 3 is continued. When the judgment of step ST10 is "No", the control of the car 3 is completed.

Note that the compensatory position information may always be calculated in step ST15 regardless of whether the judgment of step ST19 is "Yes" or "No".

According to the third embodiment described above, since the compensatory position information of the car 3 is calculated based on a temperature acquired with a thermometer, even when the code tape 11 elongates or contracts due to changes in temperature, accurate position control of the car 3 can be performed without increasing the number of installed reference markers 16.

REFERENCE SIGNS LIST

1 Elevator device
2 Hoistway
3 Car
4 Counter weight
5 Main rope
6 Traction machine
7 Rail
8 Car door
9 Hatch door
10 Control unit
11 Code tape
12 Code tape tension spring
13 Code read sensor
14 Evaluation unit
15 Reference sensor
16 Reference marker
20, 30, 40 Code tape elongation/contraction detection unit
21, 31 Elongation/contraction detection rod
22, 32 Rail-side support point

16

23, 33 Code tape-side support point
24, 34 Angle detection unit
241 Switch block
242a to 242d Elongation/contraction detection switch
341 Elongation/contraction detection wire
342 Elongation/contraction detection pulley
343 Wire tension spring
344 Elongation/contraction detection encoder
S1 Torque signal
S2 Open/close control signal
S3 Reference marker detection signal
S4 Position information
S5 Amount of elongation or contraction
S6 Code read signal

The invention claimed is:

1. An elevator device, comprising:
a car which travels through a hoistway;
a code tape suspended in the hoistway;
a code read sensor which reads a code described in the code tape;
a code tape elongation/contraction detection unit which detects an amount of elongation or contraction of the code tape;
a reference marker which is installed in the hoistway and which indicates a reference position of the car;
a reference sensor which is installed in the car and which detects the reference marker; and
circuitry which, when a condition based on the amount of elongation or contraction is satisfied, move the car to the reference position in accordance with a detection result of the reference sensor, cause position information of the car determined based on the code to be read as reference position information, calculate compensatory position information based on the reference position information, and control the car using the compensatory position information, wherein
the condition is that the amount of elongation or contraction from the time of a previous calculation of the compensatory position information is equal to or larger than a predetermined amount.

2. An elevator device, comprising:
a car which travels through a hoistway;
a code tape suspended in the hoistway;
a code read sensor which reads a code described in the code tape;
a code tape elongation/contraction detection unit which detects an amount of elongation or contraction of the code tape; and
circuitry which calculate compensatory position information based on position information of the car determined based on the code and the amount of elongation or contraction of the code tape and which control the car using the compensatory position information.

3. The elevator device according to claim 1, wherein the code tape elongation/contraction detection unit includes an elongation/contraction detection rod of which one end is supported by a rotatable support point being fixed to the hoistway, which has an angle detection unit fixed to another end thereof, and which is supported between the one end and the other end so as to be constrained in a vertical direction with respect to the code tape, and the amount of elongation or contraction is detected based on an angle of the elongation/contraction detection rod having been detected by the angle detection unit.

4. The elevator device according to claim 3, wherein the angle detection unit is constituted of a switch block which moves up and down due to a rotation of the elongation/contraction detection rod and a switch which is operated due to a contact made by the switch block, wherein the code tape elongation/contraction detection unit detects the amount of elongation or contraction by an operation of the switch.

5. The elevator device according to claim 3, wherein the angle detection unit is an encoder, and the code tape elongation/contraction detection unit detects the amount of elongation or contraction due to an angle detected by the encoder.

6. The elevator device according to claim 1, wherein the code tape elongation/contraction detection unit includes:

a wire fixed to an end of the code tape;

a pulley on which the wire is hung and which rotates due to an elongation or a contraction of the code tape; and an encoder which detects an angle of the pulley, and the amount of elongation or contraction is detected due to the angle.

7. The elevator device according to claim 1, wherein the code tape elongation/contraction detection unit is a thermometer provided in the hoistway, and the amount of elongation or contraction is detected in accordance with a temperature measured by the thermometer.

8. The elevator device according to claim 2, wherein the code tape elongation/contraction detection unit includes an elongation/contraction detection rod of which one end is supported by a rotatable support point being fixed to the hoistway, which has an angle detection unit fixed to another end thereof, and which is supported between the one end and the other end so as to be constrained in a vertical direction with respect to the code tape, and the amount of elongation or contraction is detected based on an angle of the elongation/contraction detection rod having been detected by the angle detection unit.

9. The elevator device according to claim 8, wherein the angle detection unit is constituted of a switch block which moves up and down due to a rotation of the elongation/contraction detection rod and a switch which is operated due to a contact made by the switch block, wherein the code tape elongation/contraction detection unit detects the amount of elongation or contraction by an operation of the switch.

10. The elevator device according to claim 8, wherein the angle detection unit is an encoder, and the code tape elongation/contraction detection unit detects the amount of elongation or contraction due to an angle detected by the encoder.

11. The elevator device according to claim 2, wherein the code tape elongation/contraction detection unit includes:

a wire fixed to an end of the code tape;

a pulley on which the wire is hung and which rotates due to an elongation or a contraction of the code tape; and an encoder which detects an angle of the pulley, and the amount of elongation or contraction is detected due to the angle.

12. The elevator device according to claim 2, wherein the code tape elongation/contraction detection unit is a thermometer provided in the hoistway, and the amount of elongation or contraction is detected in accordance with a temperature measured by the thermometer.

* * * * *